UNITED STATES PATENT OFFICE.

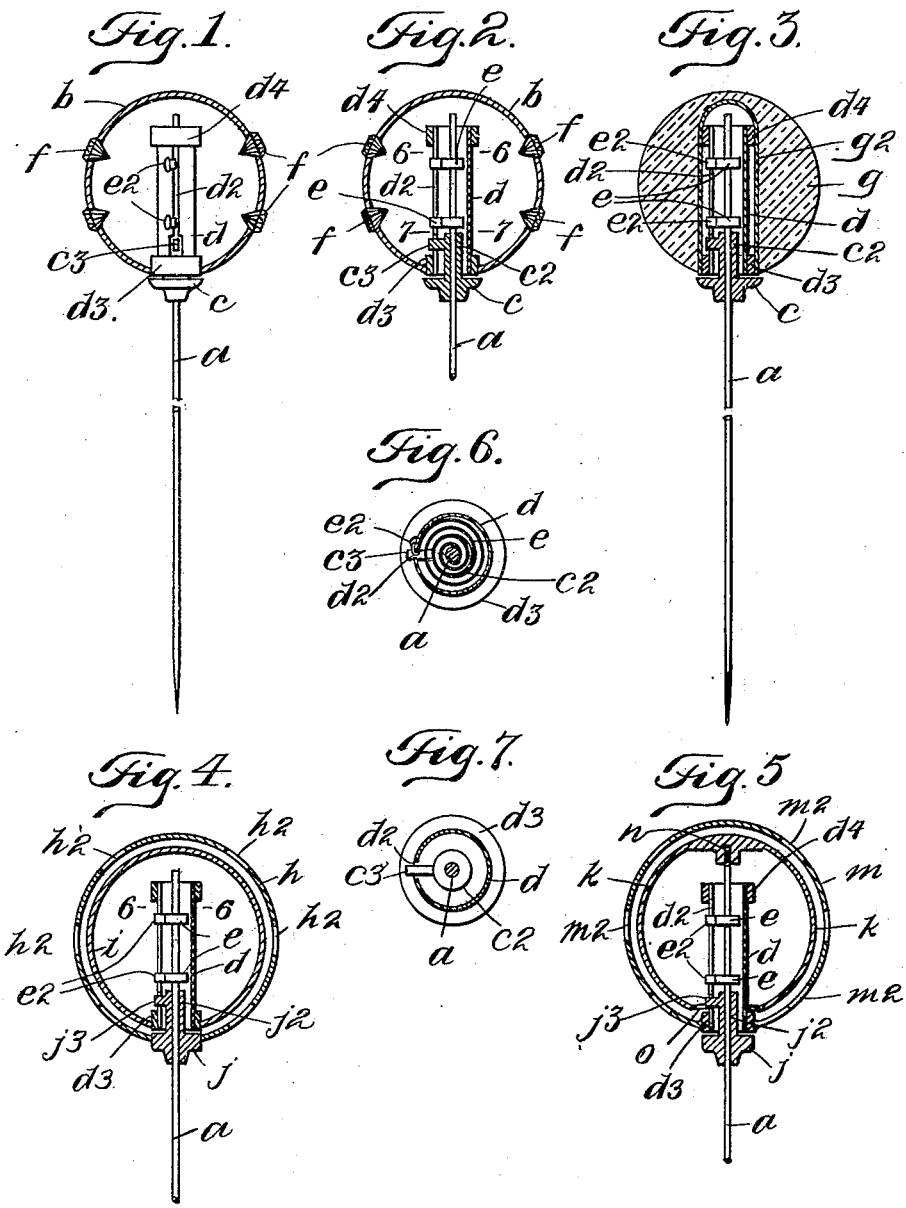

ALFRED A. BOISMAURE, OF NEW YORK, N. Y., ASSIGNOR TO THE BOISMAURE OSCILLATING JEWELRY COMPANY, OF NEW JERSEY.

JEWEL-MOUNTING.

No. 831,033.     Specification of Letters Patent.     Patented Sept. 18, 1906.

Application filed August 17, 1904. Serial No. 221,015.

*To all whom it may concern:*

Be it known that I, ALFRED A. BOISMAURE, a citizen of the United States, residing at New York, in the county of New York and State of New York, have invented certain new and useful Improvements in Jewel-Mountings, of which the following is a specification, such as will enable those skilled in the art to which it appertains to make and use the same.

This invention relates to jewel-mountings, and particularly to jewel-mountings for hat-pins; and the object thereof is to provide a pin of this class having a head a part or all of which is kept in a constant state of vibration, said head or a part thereof being formed to represent jewels or being provided with jewel-mountings whereby owing to the vibratory member a brilliant and beautiful effect is produced.

The invention is fully disclosed in the following specification, of which the accompanying drawings form a part, in which the separate parts of my improvement are designated by suitable reference characters in each of the views, and in which—

Figure 1 is a side view of a hat-pin, the head of which is vibratorily mounted and consisting of a hollow ball or body having jewels set therein, said head being shown in section; Fig. 2, a similar view showing the support of the head also in section; Fig. 3, a view similar to Fig. 2, in which the head is composed of a solid body; Fig. 4, a view similar to Fig. 2, in which the head consists of two concentrically-arranged hollow bodies, the inner one being vibratorily mounted and the outer body being provided with holes or openings through which the inner body may be seen; Fig. 5, a view similar to Fig. 4, in which the outer body is vibratorily mounted; Fig. 6, a section on the line 6 6 of Figs. 2 and 4, and Fig. 7 a section on the line 7 7 of Fig. 2.

In the accompanying drawings all of the figures are on an enlarged scale, Figs. 1 to 5, inclusive, being on the same scale, and Figs. 6 and 7 being on a still larger scale.

In the practice of my invention as shown in Figs. 1, 2, and 6 I provide a hat-pin $a$, having a hollow ball or body $b$ for a head. To the pin $a$ is secured a collar or similar device $c$, having a hub $c^2$, provided with a laterally-projecting finger $c^3$, and the hub $c^2$ fits loosely and concentrically in a tube or sleeve $d$, secured in one side of the ball or body $b$ and ranging radially therein. In one side of the tube $d$ is a longitudinal slot $d^2$, and secured to the pin $a$ within the tube $d$ are two spiral springs $e$, one end of said springs being secured to the pin and the other being passed out through the slot $d^2$ into the tube $d$ and being bent over and secured to the side of said tube, as shown at $e^2$. The tube $d$ is provided at its lower end with a collar $d^3$, which is secured in a corresponding opening in the ball or body $b$, and said tube is provided at its inner or other end with a similar collar $d^4$. It will thus be seen that the ball or body $b$ is only connected with the pin $a$ by means of the springs $e$, and said springs are formed from fine spring metal, and the ball or body $b$ is kept thereby in a constant state of vibration, no matter in what position the pin may be held, and said ball or body $b$ is provided with a plurality of jewels $f$, any desired number of which may be employed.

In Fig. 3 I have shown a modification in which a ball or body $g$ is employed as the head of the pin, and said ball or body is composed of colored glass or other ornamental material and may be cut or formed of any desired shape or provided with facets in the manner of ordinary jewels, and secured to and inclosing the tube $d$ is a socket or thimble $g^2$, which is secured in the ball or body $g$ and incloses both the tube $d$ and the springs $e$. The socket or thimble $g^2$ is secured to the collars $d^3$ and $d^4$ in any desired manner, or the socket or thimble $g^2$ may be secured in the ball or body $g$ by cement in any desired manner, and with this form of construction the ball or body $g$ will be kept in a constant state of vibration, the same as the ball or body $b$. (Shown in Figs. 1 and 2.)

In Fig. 4 I have shown another modification in which two balls or bodies $h$ and $i$ are employed to form the head of the pin, said balls or bodies being placed one within the other, and in this form of construction the inner ball or body $i$ is secured to the collar $d^3$ in the same manner as the ball or body $b$ in Figs. 1 and 2, while the outer ball or body $h$ is secured to the collar $j$, which is secured to the pin $a$ and which is provided with a hub $j^2$, the collar $j$ and the hub $j^2$ thereof being similar to the collar $c$ and the hub $c^2$ thereof, (shown in Figs. 1, 2, and 3,) the hub $j^2$ being provided with a finger $j^3$, similar to the finger $c^3$. In this form of construction the tube $d$ and the springs $e$ are exactly the same as shown in Figs. 1, 2, and 3, and the inner ball or body $i$ will be kept in a constant state of vibration no matter in what position the pin may be held. The outer body or ball $h$ is provided with holes or openings $h^2$, any desired number of which may be employed and through which the inner ball or body $i$ may be seen, and the inner ball or body $i$ may be made of any desired material, colored glass, translucent material, or of metal, and said ball or body may be provided with brilliants, jewels, or other ornamental devices which may be seen through the holes or openings $h^2$ of the outer ball or body $h$.

In Fig. 5 I have shown another modification, in which two concentric balls or bodies $k$ and $m$ constitute the head of the pin, both of said balls or bodies being hollow and one of them being placed within the other, and in this form of construction the collar $j$ is employed and the tube $d$ is secured to the outer ball or body $m$, while the pin $a$ is secured to the inner ball or body $k$, and the tube $d$ passes loosely into the inner ball or body $k$, as shown at $o$, and the end of the pin $a$ in this form of construction is also secured to the inner ball or body $k$, as shown at $n$, and with this form of construction the outer ball or body $m$ will be kept in a constant state of vibration, no matter in what position the pin be held. The outer ball or body $m$ is provided with holes or openings $m^2$, any desired number of which may be employed and through which the inner ball or body $k$ may be seen, and said inner ball or body $k$, as in the case of the inner ball or body $i$ shown in Fig. 4, may be made of any desired material, may be ornamented in any desired way, or may be provided with jewels which may be seen through the holes or openings $m^2$.

It will be apparent that the finger $c^3$ of the hub $c^2$ of the collar $c$ in the form of construction shown in Figs. 1, 2, and 3, limit the rotary or vibratory movement of the tube $d$ and the part or parts connected therewith, and this is also true of the finger $j^3$ of the hub $j^2$ of the collar $j$, (shown in Figs. 4 and 5,) and the movement of the party using or wearing the pin is sufficient to give the head of the pin or a part thereof a constant oscillating or vibratory movement, and it will be observed that that part of the slot $d^2$ of the tube $d$ through which the fingers $c^3$ and $j^3$ project is larger than the remainder of said slot.

My improved pin or the head thereof may be made very ornamental and attractive, so as to produce a brilliant effect or appearance, and it will be apparent that my improved pin may be used for many other purposes, as well as for the purpose of a hat-pin.

Having fully described my invention, what I claim as new, and desire to secure by Letters Patent, is—

1. A device of the class described, comprising a head, a slotted tube inserted into said head, and a pin the head end of which is inserted loosely into said tube and vibratorily connected to the latter at the slotted portion thereof, substantially as shown and described.

2. A device of the class described, comprising a head, a slotted tube inserted in said head, a pin the head end of which is loosely inserted in said tube, and spiral springs for vibratorily connecting the pin and tube, said springs being connected to said pin and the slotted portion of the tube.

3. A pin provided adjacent to one end thereof with a collar having a hub provided with a laterally-directed finger, a tube inclosing said hub and said end of said pin and provided in one side with an opening through which said finger projects, spiral springs mounted on said end of the pin and one end of which is secured thereto and the other to said tube, and a head member for said pin into which said tube is inserted, substantially as shown and described.

4. A pin provided near one end with a collar having a hub provided with a laterally-directed finger, a tube inclosing said hub and the said end of the pin and provided in one side with an opening through which said finger projects, spiral springs mounted on said end of the pin and secured thereto and to said tube, and a head composed of separate parts one of which is placed within the other and one of which is connected with said pin and the other with said tube whereby one of the parts of the head is vibratorily supported, substantially as shown and described.

5. A pin provided near one end with a collar having a hub provided with a laterally-directed finger, a tube inclosing said hub and the said end of the pin and provided in one side with an opening through which said finger projects, spiral springs mounted on said end of the pin and secured thereto and to said tube, and a head composed of separate parts one of which is placed within the other and one of which is connected with said pin and the other with said tube whereby one of the parts of the head is vibratorily supported, and the outer member of the head being provided with openings through which the inner member may be seen, substantially as shown and described.

6. In a device of the class described, a tube, a pin the head end of which is loosely inserted in said tube, spiral springs vibratorily connecting the pin and the tube, means carried by said pin and coöperating with said tube for limiting vibratory movement of the tube upon the pin, and a head into which said tube is inserted.

In testimony that I claim the foregoing as my invention I have signed my name, in presence of the subscribing witnesses, this 15th day of August, 1904.

ALFRED A. BOISMAURE.

Witnesses:
 F. A. STEWART,
 C. E. MULREANY.